United States Patent

Yang et al.

(10) Patent No.: US 7,358,622 B2
(45) Date of Patent: Apr. 15, 2008

(54) DISTRIBUTED POWER GENERATION SYSTEM USING A FUEL CELL AND A METHOD OF CONTROLLING THE SAME

(75) Inventors: Hyun-sup Yang, Changwon-si (KR); Seung-ki Sul, Seoul (KR)

(73) Assignee: Samsung Techwin Co., Ltd., Changwon (KR)

(*) Notice: Subject to any disclaimer, the term of this patent is extended or adjusted under 35 U.S.C. 154(b) by 0 days.

(21) Appl. No.: 11/820,186

(22) Filed: Jun. 18, 2007

(65) Prior Publication Data

US 2007/0241722 A1   Oct. 18, 2007

Related U.S. Application Data

(62) Division of application No. 11/185,183, filed on Jul. 20, 2005, now Pat. No. 7,250,690.

(30) Foreign Application Priority Data

Oct. 1, 2004   (KR) .................. 10-2004-0078261

(51) Int. Cl.
F02N 11/00   (2006.01)
(52) U.S. Cl. .................. 290/39; 290/40 R; 290/40 C; 290/40 A; 290/52; 290/40 E
(58) Field of Classification Search .............. 290/40 F, 290/40 R, 40 C, 40 A, 52, 40 E
See application file for complete search history.

(56) References Cited

U.S. PATENT DOCUMENTS 4,084,038 A   4/1978   Scragg et al.
4,185,203 A   1/1980   Takeuchi
4,281,256 A   7/1981   Ahrens et al.
4,757,686 A   7/1988   Kawamura et al.
4,828,940 A   5/1989   Cohen et al.

(Continued)

FOREIGN PATENT DOCUMENTS

WO   WO 02/37587 A2   5/2002

*Primary Examiner*—Darren Schuberg
*Assistant Examiner*—Iraj A. Mohandesi
(74) *Attorney, Agent, or Firm*—Drinker Biddle & Reath LLP

(57) ABSTRACT

Provided is a distributed-power-generation system capable of maintaining an operation point and a method of controlling the same. The distributed-power-generation system comprises: a fuel cell producing current and high-temperature gas through an electric chemical reaction of hydrogen and oxygen; a turbine obtaining rotation power using heat produced by the fuel cell; a compressor supplying air to the fuel cell using the rotation power of the turbine; a motor/generator unit acting as a motor using a current supplied from a battery in a starting mode, and as a generator rotating by rotation power of a turbine and generating a current in a generating mode; and an inverter unit supplying a DC power produced by the fuel cell and an AC power produced by the motor/generator unit for a three-phase power system. The method of controlling the distributed-power-generation system comprises: sensing a rotation speed of a rotation axis of the motor/generator unit; comparing the sensed rotation speed and a predefined reference speed; and supplying a current to the motor/generator unit to produce a load in the opposite direction of rotation of the rotation axis or in the same direction.

4 Claims, 2 Drawing Sheets

U.S. PATENT DOCUMENTS

| | | |
|---|---|---|
| 5,225,712 A | 7/1993 | Erdman |
| 5,391,925 A * | 2/1995 | Casten et al. ............... 290/1 R |
| 5,678,647 A | 10/1997 | Wolfe et al. |
| 5,811,201 A | 9/1998 | Skowronski |
| 6,201,312 B1 | 3/2001 | Shioiri et al. |
| 6,380,637 B1 | 4/2002 | Hsu et al. |
| 6,380,640 B1 | 4/2002 | Kanamori et al. |
| 6,559,551 B2 | 5/2003 | Graage et al. |
| 6,616,424 B2 | 9/2003 | Raiser |
| 6,628,006 B2 | 9/2003 | Oglesby et al. |
| 6,717,282 B1 * | 4/2004 | Maxwell ................... 290/40 R |
| 7,250,690 B2 * | 7/2007 | Yang et al. ................... 290/52 |

\* cited by examiner

DISTRIBUTED POWER GENERATION SYSTEM USING A FUEL CELL AND A METHOD OF CONTROLLING THE SAME

CROSS-REFERENCE TO RELATED PATENT APPLICATIONS

This patent application a divisional of U.S. patent application Ser. No. 11/185,183, filed Jul. 20, 2005, now allowed, which claims the priority of Korean Patent Application No. 10-2004-0078261, filed on Oct. 1, 2004, in the Korean Intellectual Property Office, the disclosure of each is incorporated herein in its entirety by reference.

BACKGROUND OF THE INVENTION

1. Field of the Invention

This invention pertains to a distributed-power-generation system using a fuel cell and a method of controlling the same, and more particularly, to a distributed-power-generation system using a fuel cell that maintains a required rotation speed of a rotation axis related to the operation of power generation, and a method of controlling the same.

2. Description of the Related Art

A conventional distributed-power-generation system using a fuel cell produces DC power through a chemical reaction of the fuel cell and by rectifying three-phase power produced by a generator embedded therein. The conventional distributed-power-generation system converts the DC power obtained from the two kinds of power sources into AC power having a frequency of 50 Hz to 60 Hz using an inverter, and supplies the AC power for a three-phase power system.

A high-temperature gas is produced as a by-product by the chemical reaction of the fuel cell. The conventional distributed-power-generation system supplies power necessary for supplying air to the fuel cell using the high-temperature gas and provides the generator with a rotation power. That is, the conventional distributed-power-generation system provides a turbine connected to the rotation axis of a compressor and the generator with the high-temperature gas produced by the fuel cell while operating the compressor and the generator, thereby increasing energy efficiency.

In the conventional distributed-power-generation system using the fuel cell, the rotation speed of the generator depends on the volume of gas provided to the turbine. Also, the power efficiency of the generator varies according to the volume of the high-temperature gas that is produced by the fuel cell and provided to the turbine. An operation point of the conventional distributed-power-generation system using the fuel cell and the generator that rotates at high speed changes. As the volume of the high-temperature gas that rotates the turbine changes, it is impossible to operate the distributed-power-generation system while maintaining the power efficiency of the fuel cell. Also, since the power efficiency of the generator that rotates at high speed changes, it is difficult to maintain the optimum efficiency of the distributed-power-generation system.

The compressor containing an impeller that rotates at high speed goes through a variety of vibration modes from the time it starts to operate until it reaches a predetermined operation point, or when it moves from the predetermined operation point having a required speed to another operation point having a different speed. A variable operation of the distributed-power-generation system using the generator that rotates at high speed makes it impossible to avoid vibration when the operation point of the distributed-power-generation system changes. Thus, a distributed-power-generation system capable of maintaining a required speed is greatly required along with a method of controlling the system.

SUMMARY OF THE INVENTION

The present invention provides a distributed-power-generation system capable of maintaining an operation point and a method of controlling the same.

The present invention also provides a distributed-power-generation system capable of maintaining a required rotation speed of a generator and a method of controlling the same in order to maintain the operation point of the distributed-power-generation system.

According to an aspect of the present invention, there is provided a distributed-power-generation system, comprised of a fuel cell, a generation unit, and an inverter unit, wherein the generation unit comprises a motor/generator unit that acts, in a starting mode, as a motor using a current supplied from a battery and, in a generating mode, as a generator that rotates by a rotation power of a turbine and generates AC power. The inverter unit comprises a rectification circuit and a main inverter.

The invention also involves a method of controlling the distributed-power-generation system, the method comprised of: a) sensing a rotation speed of a rotation axis of the motor/generator unit; b) comparing the sensed rotation speed to a predefined reference speed; c) changing the rotation speed to the reference speed by controlling an amount of current supplied to the motor/generator; d) converting the AC power produced by the motor/generator unit into DC power through a smoothing circuit, and supplying the converted DC power along with DC power produced by the fuel cell to the main inverter; e) comparing the DC power supplied to the main inverter to the reference power; f) increasing/reducing, as necessary, the DC power produced by the fuel cell and changing the DC power supplied to the main inverter to the reference power; and g) supplying the DC power of the main inverter to a three-phase power system.

When the sensed rotation speed is higher than the reference speed, the rotation speed is changed to the reference speed by supplying a current to the motor/generator unit to produce the load in the opposite direction of rotation of the rotation axis. When the sensed rotation speed is lower than the reference speed a current is supplied to the motor/generator unit to rotate in the same direction of rotation of the rotation axis;

In one embodiment, the motor/generator unit may produce a load in the opposite direction of rotation of the rotation axis according to current supplied from the battery.

In another embodiment, the inverter unit may further comprises a smoothing circuit including a predetermined number of capacitors, wherein when a voltage at both ends of the capacitor exceeds the reference voltage, a current of the capacitor is discharged to the three-phase power system to prevent the capacitor from being excessively overcharged.

According to another aspect of the present invention, there is provided a distributed-power-generation system, comprising a fuel cell, a turbine, a compressor, a motor/generator unit, and an inverter unit supplying DC power produced by the fuel cell and AC power produced by the motor/generator unit to a three-phase power system, wherein the inverter unit comprises a rectification circuit, a smoothing circuit, a DC/DC converter, and a main inverter, wherein the DC/DC converter is connected to a chargeable battery that is charged with a current from the DC/DC converter and supplies the current to the motor/generator unit.

According to another aspect of the present invention, there is provided a distributed-power-generation system, comprising: a fuel cell producing a current and a high-temperature gas through an electric chemical reaction of hydrogen and oxygen; a turbine obtaining a rotation power using heat produced by the fuel cell; a compressor supplying air to the fuel cell using the rotation power of the turbine; a motor/generator unit acting as a motor using a current supplied from a battery in a starting mode, and as a generator that rotates by the rotation power of the turbine and generates a current in a generating mode; and an inverter unit supplying DC power produced by the fuel cell and AC power produced by the motor/generator unit to a three-phase power system, wherein the inverter unit comprises a rectification circuit, a smoothing circuit, a DC/DC converter, and a main inverter, wherein the DC/DC converter is connected to a chargeable battery that is charged with a current from the DC/DC converter and supplies the current to the motor/generator unit.

The compressor may supply hydrogen and oxygen to the fuel cell, and the high-temperature gas produced by the fuel cell is used to rotate the turbine, the system further comprising: a recuperator preheating air that is supplied to the fuel cell from the compressor using the high-temperature gas that is used to rotate and discharged from the turbine.

The system may further comprising: a control unit containing a sensor that senses the rotation speed of the rotation axis of the motor/generator unit, comparing the rotation speed sensed by the sensor and a predefined reference speed, supplying a current produced by the battery to the motor/generator unit, changing the rotation speed to the reference speed using load or the rotation power, thereby maintaining a required rotation speed of the rotation axis of the motor/generator unit.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
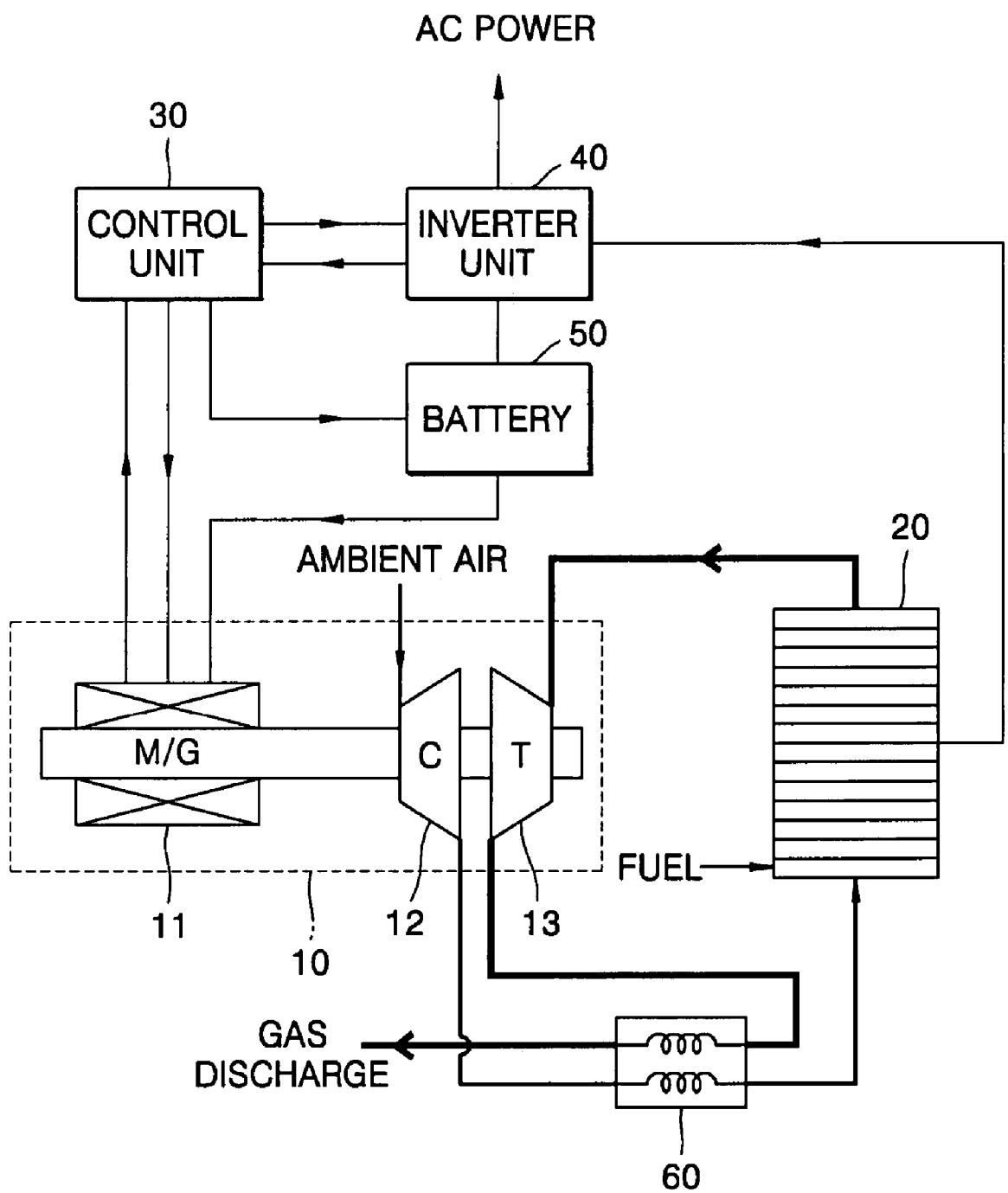
FIG. 1 is a block diagram of a distributed power generation system using a fuel cell according to an embodiment of the present invention.

FIG. 1 is a block diagram of a distributed-power-generation system using a fuel cell according to an embodiment of the present invention. Referring to FIG. 1, the distributed-power-generation system comprises a fuel cell 20, a turbine generation unit 10, a control unit 30, and an inverter unit 40.

The fuel cell 20 produces current and a high-temperature gas through an electric chemical reaction of hydrogen and oxygen. The high-temperature gas produced by the fuel cell 20 is supplied to the turbine generation unit 10.

The turbine generation unit 10 comprises a motor/generator unit 11, a compressor 12, and a turbine 13. The motor/generator unit 11 including a stator and a rotor acts as a motor in a starting mode of the turbine generation unit 10, and as a generator in a generating mode of the turbine generation unit 10.

The compressor 12, the turbine 13, and the motor/generator unit 11 form a single rotation axis. The motor/generator unit 11 rotates in the starting mode and rotates an impeller of the compressor 12. The compressor 12 takes in external air and supplies the compressed air to the fuel cell 20. The high-temperature gas produced by the fuel cell 20 is supplied to and rotates the turbine 13, thereby allowing the motor/generator unit 11 to function as a generator.

DC power produced by the fuel cell 20 and AC power produced by the motor/generator unit 11 are supplied to a three-phase power system through the inverter unit 40. The inverter unit 40 converts the AC power produced by the motor/generator unit 11 into DC power, adds the converted AC power to the DC power produced by the fuel cell 20, converts the added AC/DC power into AC power, and discharges the converted AC power to a three-phase power system.

The control unit 30 contains a sensor (not shown) that senses a rotation speed of the rotation axis of the motor/generator unit 11. The control unit 30 may use separate means for measuring the rotation speed such as an encoder. The control unit 30 measures the rotation speed of the rotation axis of the motor/generator unit 11, and controls a current supplied to the motor/generator unit 11 by comparing the rotation speed with a predefined reference speed.

The motor/generator unit 11 acts as a motor in the starting mode, and is supplied with a small quantity of current in the generating mode. The motor/generator unit 11 produces the small load in the opposite direction of rotation of the rotation axis while being supplied with the small quantity of current. That is, the motor/generator unit 11 produces the small load in the opposite direction of a rotation power of the rotation axis by the high-temperature gas supplied to the turbine 13. While producing the small load, the motor/generator unit 11 reduces the rotation speed by increasing the current supplied by the control unit 30 and increasing the load in the opposite direction of rotation of the rotation axis. The motor/generator unit 11 increases the rotation speed by reducing the current supplied by the control unit 30 and reducing the load in the opposite direction of rotation of the rotation axis.

The air supplied to the fuel cell 20 is preheated by a high-temperature liquid discharged through the turbine 13 in order to improve the efficiency of the distributed- power-generation system. To this end, the distributed-power-generation system comprises a recuperator 60 that heats the air supplied to the fuel cell 20 using high-temperature liquid discharged through the turbine 13.

Figure 2:
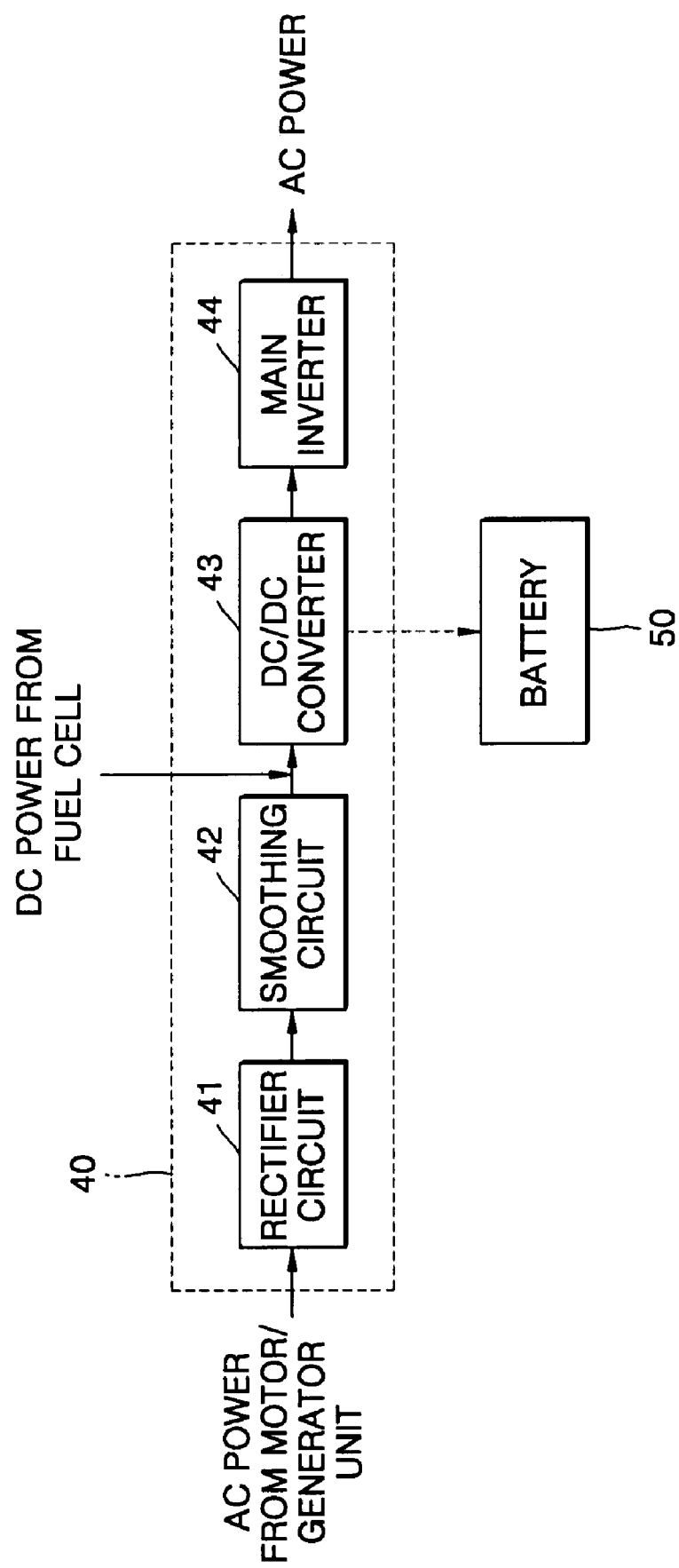
FIG. 2 is a block diagram of an inverter unit shown in FIG. 1.

FIG. 2 is a block diagram of the inverter unit 40 shown in FIG. 1. Referring to FIG. 2, the inverter unit 40 comprises a rectification circuit 41, a smoothing circuit 42, a DC/DC converter 43, and a main inverter 44.

The rectification circuit 41 converts the AC power produced by the motor/generator unit 11 into DC power. The smoothing circuit 42 is used to uniform ripple produced by the rectification circuit 41. The DC current passing through the smoothing circuit 42 along with the DC current produced by the fuel cell 20 is supplied to the DC/DC converter 43, converted into voltage necessary for the DC/DC converter 43, converted into AC current in the main inverter 44, and supplied to the three-phase power system.

A chargeable battery 50 is connected to the DC/DC converter 43 of the inverter unit 40. The battery 50 is charged with a part of a current supplied to the DC/DC converter 43, and supplies current for the motor/generator unit 11 by the control unit 30.

The smoothing circuit 42 comprising one or more capacitors makes uniform a DC wave by charging and discharging the capacitor. During the operation of the distributed-power-generation system, the capacitor contained in the smoothing circuit 42 can be damaged due to excessive overcharge. In order to prevent the capacitor from being damaged the main inverter 44 measures a voltage at both ends of the capacitor, compares the measured voltage of the capacitor with a predefined reference voltage, and discharges a current to the three-phase power system when the measured voltage exceeds a limit voltage of the capacitor.

When the rotation speed of the motor/generator unit changes due to a change in volume of the high-temperature gas produced by the fuel cell or another cause, the distributed-power-generation system quickly restores the rotation speed of the motor/generator unit to the reference speed.

When the capacitor included in the smoothing circuit is overcharged due to an action of the main inverter, the distributed-power-generation system discharges a current to the three-phase power system, thereby preventing the capacitor from being damaged.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the present invention is defined not by the detailed description of the invention but by the appended claims, and all differences within the scope of the present invention will be construed as being included in the present invention.

What is claimed is:

1. A method of controlling a distributed-power-generation system, the method comprised of:
   a) sensing a rotation speed of a rotation axis of a motor/generator unit;
   b) comparing the sensed rotation speed with a predefined reference speed;
   c) changing the rotation speed to match the reference speed by controlling an amount of current supplied to the motor/generator;
   d) converting AC power produced by the motor/generator unit into DC power through a smoothing circuit;
   e) supplying the converted DC power along with DC power produced by a fuel cell to the main inverter;
   f) comparing the DC power supplied to the main inverter with a predefined reference power;
   g) altering the DC power produced by the fuel cell and changing the DC power supplied to the main inverter to match the predefined reference power; and
   h) supplying the DC power to one of the main inverter and a three-phase power system.

2. The method of claim 1, wherein the motor/generator unit produces a load in the opposite direction of rotation of the rotation axis according to current supplied from the battery.

3. The method of claim 1, wherein when the sensed rotation speed is higher than the reference speed, the rotation speed is changed to the reference speed by supplying a current to the motor/generator unit to produce the load in the opposite direction of rotation of the rotation axis.

4. The method of claim 1, wherein when the sensed rotation speed is lower than the reference speed, the rotation speed is changed to the reference speed by supplying a current to the motor/generator unit to rotate in the same direction of rotation of the rotation axis.

* * * * *